US012783563B2

(12) United States Patent
Shinn et al.

(10) Patent No.: US 12,783,563 B2
(45) Date of Patent: Nov. 3, 2026

(54) AUTONOMOUS ERROR CORRECTION OF CHAT AGENTS

(71) Applicant: Sierra Technologies, Inc., San Francisco, CA (US)

(72) Inventors: Noah Ryan Shinn, San Jose, CA (US); Rohith Manjamkuzhi Ravi, Brisbane, CA (US)

(73) Assignee: Sierra Technologies, Inc., San Francisco, CA (US)

( * ) Notice: Subject to any disclaimer, the term of this patent is extended or adjusted under 35 U.S.C. 154(b) by 0 days.

(21) Appl. No.: 19/091,725

(22) Filed: Mar. 26, 2025

(65) Prior Publication Data

US 2026/0300344 A1 Oct. 1, 2026

(51) Int. Cl.
*G06F 16/334* (2025.01)
*G06F 40/295* (2020.01)

(52) U.S. Cl.
CPC .......... *G06F 16/334* (2019.01); *G06F 40/295* (2020.01)

(58) Field of Classification Search
CPC ............................. G06F 16/334; G06F 40/295
See application file for complete search history.

(56) References Cited

U.S. PATENT DOCUMENTS 10,477,021 B1 * 11/2019 Mossoba .............. G06Q 30/016 707/999.003
2019/0103111 A1 * 4/2019 Tiwari ................ G06F 16/3329 707/999.003
2022/0293107 A1 9/2022 Leaman et al.
2024/0283868 A1 * 8/2024 Ferris .................... H04M 3/362 707/999.003
2025/0016124 A1 * 1/2025 Rosenberg .............. H04L 51/56 707/737
2025/0245441 A1 * 7/2025 Porras ..................... G06F 40/40 707/737
2025/0335710 A1 * 10/2025 Butvinik .............. G06F 40/284 707/737

FOREIGN PATENT DOCUMENTS

JP 2020034626 A * 3/2020

OTHER PUBLICATIONS

Patent Cooperation Treaty, International Search Report and Written Opinion, International PCT Application No. PCT/US2025/061493, Mar. 23, 2026, 18 pages.

* cited by examiner

*Primary Examiner* — Yuk Ting Choi
(74) *Attorney, Agent, or Firm* — Fenwick & West LLP

(57) ABSTRACT

A system for autonomously correcting errors in chat agents is described herein. The system receives transcript of a conversation of queries from a user and responses provided from a first agent configured to provide responses with respect to an objective during the conversation. The objective is associated with a baseline framework for evaluating conversation efficacy. In response to determining that a level of semantic similarity between the transcript and the baseline framework is outside a threshold tolerance, the system determines a portion of the transcript that caused the conversation to diverge from the baseline framework. The system creates, for each of a set of candidate agents, a candidate transcript. In response to determining that a level of semantic similarity between a candidate transcript of any candidate agent and the baseline framework is within a threshold tolerance, the system selects the any candidate agent to replace the first agent.

20 Claims, 6 Drawing Sheets

600

AUTONOMOUS ERROR CORRECTION OF CHAT AGENTS

TECHNICAL FIELD

The disclosure generally relates to the field of artificial intelligence (AI), and more specifically relates to autonomously debugging a deployed AI agent.

BACKGROUND

Agents are software that coordinate sequences of interactions with AI (artificial intelligence), such as LLMs (large language models) and external software systems. In chat automation systems, LLMs are difficult to deploy because they are not deterministic. This limitation may result in inconsistent actions being taken and inconsistent messaging given similar prompts that should yield consistent messaging. This limitation may also result in hallucinations that provide inaccurate or incoherent information.

Existing methods of using LLMs to for chat automation systems face a few challenges. For one, the construction of conversational responses output from an LLM hinge upon Natural Language Processing (NLP) techniques used to interpret inputs and generate responses. Advanced models attempt to maintain the context over a series of interactions, replicating a human conversation style. However, these models often struggle to maintain a consistent and correct conversation flow. Such struggles may be due to a shallow understanding of context-dependent meanings in a conversation, inability to related outputs to past conversational interactions, and limited memory.

Further, existing LLMs often experience "output hallucinations", where the LLM produces seemingly relevant responses which, upon closer inspection, are nonsensical or unrelated to a provided instruction. For example, an agent associated with an LLM could deviate from a set objective and start generating text or instructions itself, often leading to confusion. These issues may manifest due to training on large and diverse data sets and misinterpretation of data due to inherent complexity.

Yet further, debugging of LLMs that produce incoherent responses often requires manual debugging. Though AI may be used to flag outputs from LLMs that may be hallucinations or otherwise nonsensical, the outputs are sent to an external operator for review, such that the external operator can manually retrain or otherwise reconfigure an associated LLM. This is time-consuming and cumbersome, which is not ideal for a deployed LLM that needs to be debugged quickly in order to continue to output responses to queries from real-world users. And despite the manual review, the LLM may still experience output issues that require further manual debugging.

SUMMARY

Systems and methods are disclosed herein that generate AI agents. In some embodiments, an agentic system receives instructions to create a first AI agent that is configured to respond to natural language queries during a conversation with a user. The instructions include an objective for the first AI agent in having the conversation. The agentic system inputs a prompt to an LLM, where the prompt indicates to generate a baseline framework for evaluating an efficacy of the conversation. The agentic system receives the baseline framework from the LLM and programs the first AI agent based on the baseline framework. The agentic system runs a simulation on the first AI agent using a second AI agent. During the simulation, the second AI agent has a simulated conversation with the first AI agent during which the second AI agent generates natural language queries toward the objective based on responses from the first AI agent. The agentic system receives a transcript of the simulated conversation as a result of the simulation. The agentic system determines whether a level of semantic similarity between the transcript and the baseline framework is within a threshold tolerance and, in response to the level of semantic similarity being within the threshold, the agentic system provides access to the first AI agent to the user via a client device.

This method of simulating conversations using baseline frameworks improves the amount of predictable behavior from LLM-based agents. While instruction-tuned LLMs are very good at following instructions, LLMs tuned for objectives described in natural language queries tend to fail to properly interpret the natural language queries in a way that allows the LLMs to stay objective-focused while still providing coherent outputs. The use of simulations allows autonomous testing of these LLMs before deployment to users, thus optimizing of performance of the LLMs without the excessive time and external interaction needed by conventional agentic systems. By using this method, the agentic system saves computational expense and latency that would otherwise be spent deploying nonoptimal LLM-based agents and recalling those LLM-based agents for further tuning and testing.

In some embodiments, the agentic system receives a transcript of a conversation of queries from a user and responses to the queries provided by a first AI agent. The first AI agent is configured to provide responses with respect to an objective during the conversation. The objective is associated with a baseline framework for evaluating an efficacy of the conversation. The agentic system determines whether a level of semantic similarity between the transcript and the baseline framework is within a threshold tolerance. In response to determining that the level of semantic similarity between the transcript and the baseline framework is outside the threshold tolerance, the agentic system determines a portion of the transcript that caused the conversation to diverge from the baseline framework. The agentic system creates, for each of a set of candidate AI agents, a respective candidate transcript. In particular, the agentic system inputs a truncated version of the transcript to a respective candidate AI agent and running a simulation with the respective candidate AI agent from the end of the truncated transcript onward. The truncated version of the transcript ends at the portion of the transcript that caused the conversation to diverge from the baseline framework, and the respective candidate transcript includes the truncated transcript, outputs of the respective candidate AI agent in response to inputting the truncated version of the transcript, and outputs of the respective candidate AI agent during the simulation.

In response to determining that the semantic similarity between a candidate transcript of any candidate AI agent in the set of candidate AI agents and the baseline framework is within the threshold tolerance, the agentic system selects that candidate AI agent as the second AI agent to replace the first AI agent and ends the creation of candidate transcripts for the set of candidate AI agents. Agentic system provides access to the second AI agent in place of the first AI agent. In some embodiments, agentic system replaces a first set of code of the first AI agent with a second set of code from the second AI agent and provides access to the first AI agent as updated with the replacement code.

This method is an improvement upon conventional methods for rectifying deficiencies in deployed AI agents, which commonly require manual troubleshooting and are inefficient for real-time application. Automatically testing with numerous potential AI agents which could feasibly substitute the deployed AI agent ensures optimal use of available resources compared to initiating the creation of a new AI agent. Furthermore, ending processing at candidate AI agents in response to finding a suitable replacement for a deployed AI agent prevents the unnecessary expenditure of compute resources that occurs by continuing to process at the other candidate AI agents on the chance that one performs better than the already suitable replacement.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
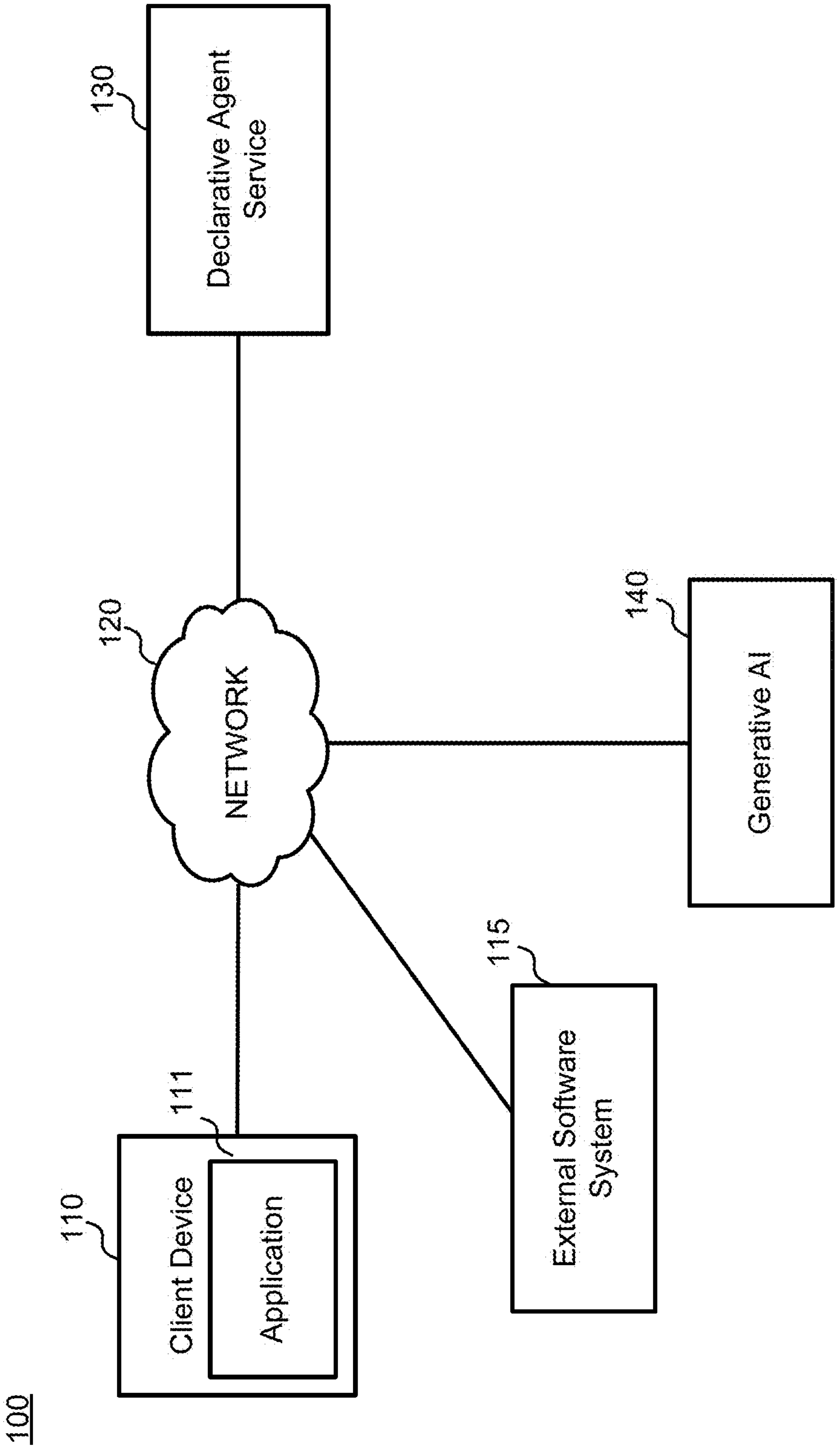
FIG. 1 illustrates one embodiment of a system environment for implementing an agentic generation system, in accordance with one or more embodiments.

Figure (FIG. 1 illustrates one embodiment of a system environment 100 for implementing an agentic generation system, in accordance with one or more embodiments. As depicted in FIG. 1, the system environment includes client device 110, external software system 115, network 120, agentic generation service 130, and generative AI 140. While the system environment 100 is only depicted with respect to one client device 110, this is for convenience only, and any number of client devices 110 may be interacting with agentic generation service 130. Client device 110 may be any device operated by an end-user having a user interface, such as a smartphone, a laptop, a personal computer, a wearable (e.g., smart watch), a kiosk, or any other electronic device capable of interfacing between a user and agentic generation service 130.

Agentic generation service 130 may be accessed by client device 110 using application 111. Application 111 may be an application dedicated to activities of agentic generation service 130 (e.g., an installed software package downloaded from agentic generation service 130 or an external repository such as an app store, or installed using other means such as a hard disk). Alternatively or additionally, application 111 may be a browser through which agentic generation service's 130 functionality may be accessed (e.g., directly, or indirectly through an embedded portal in a website of a third party company).

External software system 115 may be a software system of, e.g., a platform that utilizes agentic generation service 130. External software system 115 may require human intervention or may be utilized without a human in the loop, and may be configured to provide functionality, such as chatbot (interchangeably used with "chat automation system") functionality to users of the platform. Client device 110 may be used by an entity controlling external software system 115 to communicate to agentic generation service 130 information sufficient to deploy classifications and skills and/or may be used by end-users interacting with external software system 115 to generate or debug AI agents.

Agentic generation service 130 is used by client devices 110 and/or external software system 115 to provide a chat interface that addresses inquiries by users or by the platform of an external software system. Agentic generation service 130 is instantiated on one or more servers, accessible by way of network 120. Some or all functionality of agentic generation service 130 described herein may be distributed or fully performed by application 111 on a client device, or vice versa. Where reference is made herein to activity performed by application 111, it equally applies that agentic generation service 130 may perform that activity off of the client device, and vice versa. Agentic generation service 130 may be provided as a software development kit (SDK) to a client device or external software service to enable these entities to build the functionality of agentic generation service 130 on-premises. The SDK may export an API such that third parties (e.g., client devices or external software services) can specify their agents. Agent code using the SDK API is then uploaded to agentic generation service 130, on which it can execute (and run as an agent). Further details about the operation of agentic generation service 130 are described below with reference to FIG. 2.

Generative AI 140 may be part of agentic generation service 130 or may be a third-party provider that provides generative AI for processing natural language queries. The Generative AI 140 receives requests from the agentic generation service 130 to perform tasks using machine-learned models. The tasks include, but are not limited to, natural language processing (NLP) tasks, audio processing tasks, image processing tasks, video processing tasks, and the like. In one embodiment, the machine-learned models deployed by the Generative AI 140 are models configured to perform one or more NLP tasks. The NLP tasks include, but are not limited to, text generation, query processing, machine translation, response generation, chatbots, and the like. The Generative AI 140 may include one or many LLMs, the LLMs provided by any number of providers. In one embodiment, the LLM is configured as a transformer neural network architecture. For instance, a transformer model is coupled to receive sequential data tokenized into a sequence of input tokens and generate a sequence of output tokens depending on the task to be performed.

Figure 2:
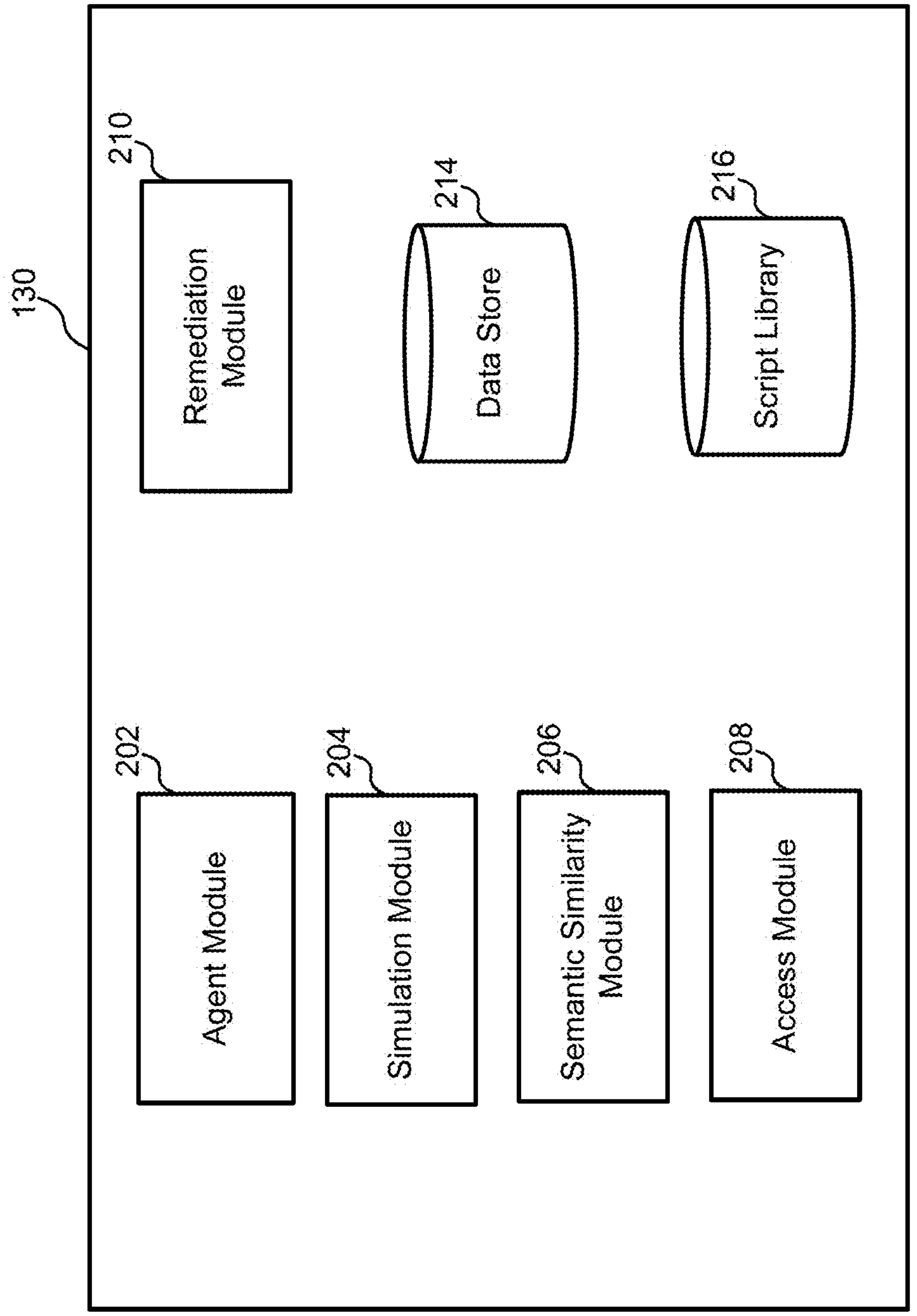
FIG. 2 illustrates one embodiment of modules of the agentic generation service, in accordance with one or more embodiments.

FIG. 2 illustrates one embodiment of modules of agentic generation service, in accordance with one or more embodiments. As depicted in FIG. 2, agentic generation service 130 includes agent module 202, simulation module 204, semantic similarity module 206, access module 208, remediation module 210, a data store 214, and a script library 216. These modules and databases are merely illustrative; fewer or more modules and/or databases may be used to achieve the functionality disclosed herein.

Agent module 202 generates AI agents based on received instructions. Agent module 202 may receive the instructions from one or more client devices 110. For a set of received instructions, the instructions may indicate for the AI agent to be configured upon generation to provide responses to natural language queries during a conversation, and the instructions may provide an objective for the AI agent. The objective may indicate a specific end result the AI agent is configured to guide conversations toward. For example, the objective may be to guide a user towards identification of an error in a script of code that the user wrote. In another example, the objective may be to troubleshoot technical difficulties the user is having.

In some embodiments, the instructions include an identifier of an entity, and agent module 202 extracts a representation of the entity to determine the objective for the AI agent. For example, agent module 202 may access one or more webpages (or other documents) associated with the entity and scrape the webpage for a set of information related to the entity. Agent module 202 may create a prompt including the information and a request for one or more objectives related to the information and input the prompt to an objective LLM from Generative AI 140. The objective LLM may be tuned to synthesize one or more actions that the entity performs for users from the information and output the actions as objectives. Agent module 202 may receive an output from the LLM indicating one or more objectives. For example, the information may indicate that the entity employs a cloud computing system for a variety of sub-entities, and based on this information, the LLM may output an objective such as application programming interface (API) creation for users. Agent module 202 stores the instructions, objective(s), and an identifier of the client device 110 that sent the instructions in association with an identifier of the AI agent in data store 214.

Agent module 202 creates a baseline framework for the one or more objectives. In some embodiments, agent module 202 creates a baseline framework for each objective. The baseline framework indicates a standard to evaluate the efficacy of a conversation against, such that semantic similarity between an actual conversation and the baseline framework being within a threshold tolerance is indicative of the actual conversation being directed at the objective of the baseline framework. For example, a baseline framework may be an example conversation with an AI agent configured based on the objective(s), where the AI agent issues responses in-line with the objective(s) throughout the entirety of the example conversation. Agent module 202 receives the baseline framework from the framework LLM.

Agent module 202 programs an AI agent based on the baseline framework. Agent module 202 may also selects, trains, and/or otherwise configures an LLM from Generative AI 140 to provide responses to natural language queries in a conversation with a user (e.g., via client device 110) such that the responses coherently respond to the natural language queries and pertain to the objective(s). Agent module 202 may write program code representing a set of pre-defined skills for the AI agent and stores the program code in script library 216 in relation to an identifier for the AI agent. The skills may include LLM calls invoking the LLM to respond to one or more natural language queries in view of the objective(s). Agent module 202 stores an identifier of the AI agent in association with the baseline framework and objective(s) in data store 214. Agent module 202 sends a request to run a simulation on the AI agent to simulation module 204.

Simulation module 204 receives requests to run simulations for AI agents. For each indication, simulation module 204 accesses the LLM and baseline framework associated with the AI agent in data store 214. Simulation module 204 runs a simulation on the AI agent using a simulation AI agent that applies a simulation LLM from Generative AI 140. More particularly, simulation module 204 configures the simulation AI agent to conduct a simulated conversation with the AI agent by providing natural language queries towards the objective based on responses provided by the AI agent. For example, simulation module 204 may create a prompt describing the objective(s) and a request to provide natural language queries, input the prompt to the simulation AI agent, and input the outputs of the simulation AI agent to the AI agent.

Simulation module 204 may create a new prompt for each output from the AI agent and include a request for a new natural language query in response to the output, as well as previous outputs and previous natural anlage queries and input the new prompt to the simulation AI agent. Simulation module 204 may continue to facilitate the simulated conversation between the simulation AI agent and the AI agent until simulation module 204 detects an end of the simulated conversation (e.g., an output related to the objective, inability to process a new prompt/input by either AI agent, etc.). The simulation results in a transcript of the simulated conversation, which simulation module 204 stores in data store 214 in association with the identifier of the AI agent. Simulation module 204 may send a request to determine a semantic similarity based on the transcript associated with the identifier of the AI agent to semantic similarity module 206.

Semantic similarity module 206 receives requests to evaluate semantic similarity. A request may include one or more transcripts, identifier of transcripts stored in data store 214, or portions of transcripts to be compared. For a request with a singular transcript, semantic similarity module 206 may access data store 214 to retrieve a baseline framework associated with an identifier of an AI agent included in a received request and determine a level of semantic similarity between the transcript and the baseline framework. For a request with two transcripts or two portions of transcripts, semantic similarity module 206 determines a level of semantic similarity between the transcripts or portions of transcripts. Semantic similarity module 206 may use one or more semantic analysis methods to determine the level of semantic similarity. For example, semantic similarity module 206 may use latent semantic analysis (LSA), topic modeling, document to vector (Doc2Vec), bidirectional encoder representations from transformers (BERT), and the like. Semantic similarity module 206 may send a determined level of semantic similarity, along with the identifier of the AI agent, to access module 208. For a request received from remediation module 210, semantic similarity module 206 may send a determined level of semantic similarity back to remediation module 210.

Access module 208 receives determined levels of semantic similarity and associated identifiers of AI agents from semantic similarity module 206 and compares each level of semantic similarity to a threshold tolerance. The threshold tolerance may be a value previously selected by an external operator or may be indicated in the instructions to generate the AI agent, which access module 208 may retrieve from data store 214. In some embodiments, access module 208 prompts an LLM to determine the threshold tolerance dynamically by analyzing conversational consequences (e.g., user satisfaction with an agent, whether the objective of the conversation was met, etc.) of semantic deviation from a baseline framework in historical conversations and defining the threshold tolerance at a level of semantic similarity where negative consequences occurred in the historical conversations. In response to determining that a level of semantic similarity is within the threshold tolerance, access module 208 deploys the AI agent by providing access to the AI agent to the client device 110 that sent instructions to generates the AI agent, which is identified in the data store 214 in association with the identifier of the AI agent. In some embodiments, access module 208 causes other client devices 110 or applications 111 to receive access to the AI agent. In response to determining that the level of semantic similarity is outside the threshold tolerance, access module 208 sends the transcript and identifier of the AI agent to remediation module 210.

Access module 208 receives transcripts of conversations with deployed AI agents. Each transcript may include queries from a user sent via a client device 110 or application 111 and responses to the queries provided by the associated deployed AI agent that is configured to provide responses with respect to an objective during the conversation. The objective may be stored in association with a baseline framework for evaluating an efficacy of the conversation and an identifier of the associated deployed AI agent in data store 214. For a received transcript, access module 208 sends a request for a level of semantic similarity between the received transcript and the baseline framework associated with the deployed AI agent to semantic similarity module 206. In some embodiments, access module 208 sends the request to semantic similarity module 206 in response to receiving an error notification associated with the received transcript. The error notification indicates that a user experienced an issue conversing with the deployed AI agent, such as an incoherent conversation, a conversation that diverged from an associated objective, etc. Access module 208 receives a level of semantic similarity from semantic module, and, in response to determining that the level of semantic similarity is outside the threshold tolerance, access module 208 sends a request for remediation, which includes the transcript and identifier of the deployed AI agent, to remediation module 210.

Remediation module 210 receives requests for remediation from access module 208. For a request for remediation, remediation module 210 accesses a baseline framework associated with an identifier of an input AI agent described in the request. Remediation module 210 determines a portion of the transcript from the request that caused the conversation of the transcript to diverge from the baseline framework. For instance, remediation module 210 may create a prompt including the transcript, the baseline framework, and a request for an indication of a portion of the transcript where the conversation diverged from the baseline framework and input the prompt to a divergence LLM of Generative AI 140. Remediation module 210 receives an indication of a portion of the transcript associated with the divergence from the divergence LLM.

Remediation module 210 performs a remediation process using a set of candidate agents. Remediation module 210 accesses a set of candidate agents. In some embodiments, the candidate agents may have been previously created by agent module 202. Remediation module 210 determines a truncated version of the transcript. The truncated version is a first portion of the transcript that includes queries made before the portion of the transcript associated with the divergence. For each candidate agent, remediation module 210 inputs the truncated version of the transcript to the candidate agent. Remediation module 210 uses queries from the truncated version of the transcript and responses from the candidate agent to form a first portion of a candidate transcript. In response to receiving a last response to a last query of the truncated version, remediation module 210 sends the last response, last query and/or first portion and an identifier of the candidate agent to simulation module 204 in a request to run a simulation. Remediation module 210 receives a transcript for a simulation run with the candidate agent, which remediation module 210 uses as a second portion of the candidate transcript included after the first portion. Remediation module 210 sends a request for a level of semantic similarity of the candidate transcript to the baseline framework to semantic similarity module 206.

For each candidate agent, remediation module 210 receives a level of semantic similarity of the candidate transcript to the baseline framework from semantic similarity module 206. Remediation module 210 compares each level of semantic similarity to the threshold tolerance. In some embodiments, remediation module 210 uses a different threshold tolerance than that used by access module 208. In response to determining that a level of semantic similarity associated with any of the candidate agents in the set of candidate agents is within the threshold tolerance, remediation module 210 selects the candidate agent associated with the level of semantic similarity within the threshold tolerance and ends creation of candidate transcripts at the rest of the candidate agents. In some embodiments, remediation module 210 selects a candidate agent associated with a highest level of semantic similarity of received semantic similarities. Remediation module 210 provides access to the selected candidate agent in place of the input AI agent. For example, remediation module 210 may cause queries sent via client device 110 or application 111 to be input to the selected candidate agent rather than to the AI agent.

In embodiments in which remediation module 210 selects a first candidate agent of the set to be associated with a semantic similarity within the threshold tolerance and truncating simulations on the other candidate agents upon selection of the first candidate agent, remediation module 210 saves compute resources that would have been spent running the simulations to find additional or alternative candidate agents. In embodiments in which remediation module 210 selects the candidate agent with the highest level of semantic similarity, remediation module 210 optimizes for a highest likelihood of the candidate agent producing outputs towards the objective, thus reducing the possibility of spending further compute resources later for further remediation.

In some embodiments, remediation module 210 staggers creation of candidate transcripts for the set of candidate agents during the remediation process. In particular, remediation module 210 may select a first subset of the set of candidate agents such that each candidate agent in the first subset is associated with a respective likelihood of transcript creation over a first threshold. For example, remediation module 210 may compare objectives or baseline similarities associated with each candidate agent to those of the AI agent, such as by creating a prompt including the objectives or baselines frameworks and a request for a likelihood of transcript creation and inputting the prompt to a likelihood LLM of Generative AI 140. Remediation module 210 receives, for each prompt, a likelihood of transcript creation from the likelihood LLM, where the likelihood of transcript creation represents a prediction of whether a respective candidate agent will provide transcripts more similar to the baseline framework than the input AI agent. Remediation module 210 selects a top percentage or ranking of candidate agents based on the likelihoods to include in the first subset.

Remediation module 210 begins processing for creation of a respective candidate transcript for each candidate agent in the first subset. Remediation module 210 determines whether any candidate agent produces a respective candidate transcript within a threshold amount of time. The threshold amount of time may be set by an external operator, may be indicated in the instructions to generate the input AI agent, or may have been otherwise input via the client device 110. In response to determining that each candidate agent in the first subset has not produced a respective candidate transcript within a threshold amount of time, remediation module 210 ends processing at each candidate agent in the first subset and selects a second subset of candidate agents. In some embodiments, remediation module 210 sends any candidate transcripts output by candidate agents in the first subset to semantic similarity module 206 and receives a level of semantic similarity for each sent candidate transcript to the baseline framework of the input AI agent. Remediation module 210 compares each received level of semantic similarity to the threshold tolerance. In some embodiments, remediation module 210 uses a higher threshold tolerance than that used by semantic similarity module 206. In response to determining that each received level of semantic similarity is outside the threshold tolerance, remediation module 210 selects a second subset of candidate agents.

Remediation module 210 may select a second subset of candidate agents within a top percentage or ranking of the candidate agents not in the first subset and begin processing creation for candidate transcripts at the second subset until determining that a candidate transcript has not been produced by the second subset within the threshold amount of time. Remediation module 210 may repeat this selection of and processing at subsets of candidate agents until remediation module 210 has attempted to create a candidate transcript for each of the set of candidate agents or until remediation module 210 determines that a candidate transcript was created within the threshold amount of time, in which case, remediation module 210 selects a respective candidate agent.

In some embodiments, remediation module 210 tracks an amount of time for performing the remediation process. In response to determining that the remediation process has extended longer than a threshold amount of time, remediation module 210 stops the remediation process. Remediation module 210 may send an alert that the remediation process was stopped to the client device 110.

In some embodiments, remediation module 210 accesses a first set of code of the selected candidate agent and a second set of code of the input AI agent, both of which may be stored in script library 216. Remediation module 210 determines one or more portions of the second set of code to replace with one or more corresponding portions of the first set of code. In some embodiments, remediation module 210 pairs responses in the candidate transcript associated with the selected candidate agent with corresponding responses in the transcript associated with the input AI agent and sends a request for a level for semantic similarity between each pair to semantic similarity module 206. For pairs of responses with a level of semantic similarity outside a similarity threshold, remediation module 210 determines a first portion of code from the first set of code that corresponds to (e.g., caused the selected candidate agent to output) the response from the candidate transcript and a second portion of code from the second set of code that corresponds to (e.g., caused the input AI agent to output) the response from the transcript. Remediation module 210 may update the input AI agent's code by replacing the second portion of code in the second set of code with the first portion of code from the first set of code.

Remediation module 210 may send a request to simulation module 204 to run a simulation using the updated code of the input AI agent, which results in a new transcript stored in association with the identifier of the input AI agent in data store 214. Remediation module 210 receives a level of semantic similarity between the new transcript and candidate transcript from semantic similarity module 206. Remediation module 210 provides access to the input AI agent to the client device 110 in response to determining that the level of semantic similarity is within the threshold tolerance. In some embodiments, remediation module 210 evaluates the level of semantic similarity between each pair of responses in the new transcript and the candidate transcript by sending a request for semantic similarity between the pair to semantic similarity module 206 and comparing received levels of semantic similarity to the threshold tolerance. Remediation module 210 may loop between replacing portions of code based on semantic similarity between responses being outside the similarity threshold, requesting another simulation with another new transcript, and semantically comparing responses until comparisons between all responses in a most recent new transcript and the candidate transcript yield semantic similarities within the similarity threshold. In response to all semantic similarities of the responses being within the similarity threshold, remediation module 210 provides access to the input AI agent (run using the updated first set of code) via the client device 110. By looping and comparing until all responses yield semantic similarities within the similarity threshold, remediation module 210 optimizes for a reduced chance of needing to perform further remediation.

Computer Architecture

Figure 3:
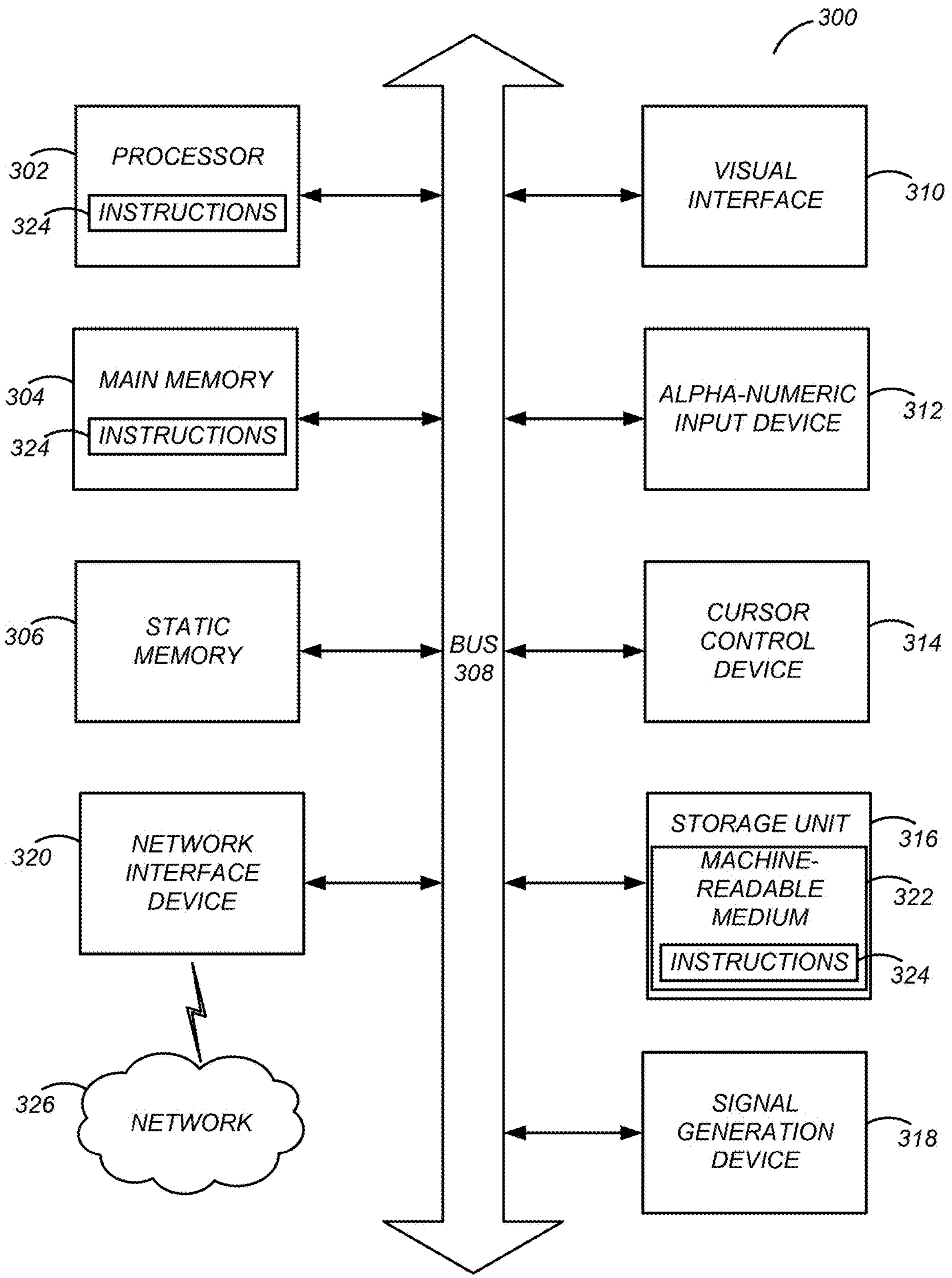
FIG. 3 is a block diagram illustrating components of an example machine able to read instructions from a machine-readable medium and execute them in a processor (or controller), in accordance with one or more embodiments.

FIG. 3 is a block diagram illustrating components of an example machine able to read instructions from a machine-readable medium and execute them in a processor (or controller). FIG. (FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes one or more processors 302 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 304, and a static memory 306, which are configured to communicate with each other via a bus 308. The computer system 300 may further include visual display interface 310. The visual interface may include a software driver that enables (or provide) user interfaces to render on a screen either directly or indirectly. The visual interface 310 may interface with a touch enabled screen. The computer system 300 may also include input devices 312 (e.g., a keyboard a mouse), a cursor control device 314, a storage unit 316, a signal generation device 318 (e.g., a microphone and/or speaker), and a network interface device 320, which also are configured to communicate via the bus 308.

The storage unit 316 includes a machine-readable medium 322 (e.g., magnetic disk or solid-state memory) on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution.

Example Methods

Figure 4:
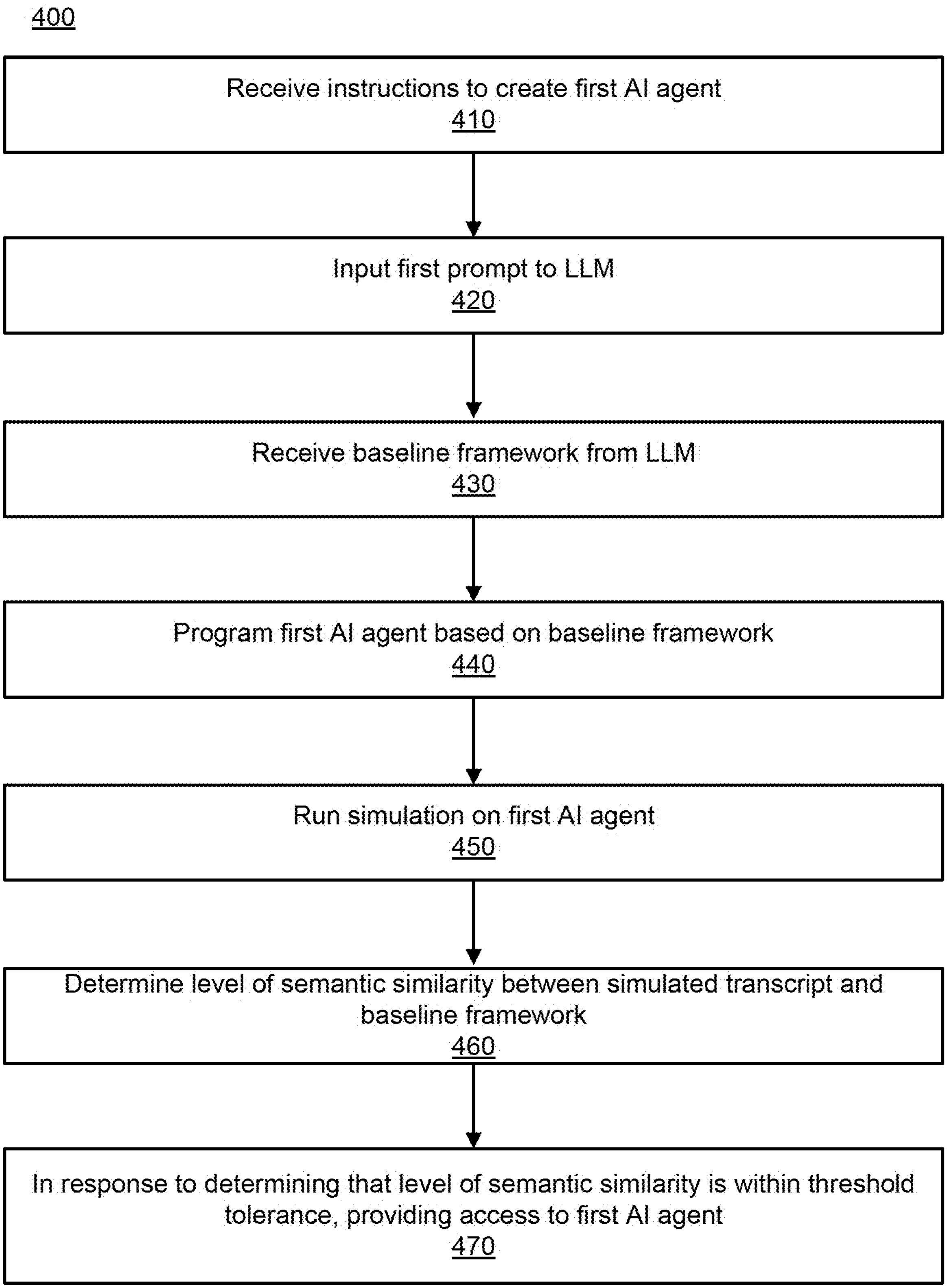
FIG. 4 is a flowchart for a method of generating a first AI agent based on a natural language query, in accordance with one or more embodiments.

FIG. 4 is a flowchart for a method 400 of generating a first AI agent based on a natural language query, in accordance with one or more embodiments. Alternative embodiments may include more, fewer, or different steps from those illustrated in FIG. 4, and the steps may be performed in a different order from that illustrated in FIG. 4. Method 400 may be executed by one or more processors 302 of a system, which may include a client device 110. The one or more processors may include processor 302 of agentic generation service 130 executing instructions (e.g., instructions 324) that cause one or more modules to perform their respective operations.

Agent module 202 receives 410 instructions to create a first AI agent. The instructions indicate for the first AI agent to be configured to provide responses to natural language queries during a conversation and include an objective for the first AI agent. Agent module 202 inputs 420 a first prompt to an LLM, such as the framework LLM described above. The first prompt is based on the objective and indicates to generate a baseline framework for evaluating an efficacy of the conversation. Agent module 202 receives 430 a baseline framework as output from the LLM. Agent module 202 programs 440 the first AI agent based on the baseline framework. Simulation module 204 runs 450 a simulation on the first AI agent. The simulation includes a second AI agent that automatically generates, in a simulated conversation, natural language queries toward the objective based on responses from the first AI agent. The simulation results in a transcript of the simulated conversation. Semantic similarity module 206 determines 460 a level of semantic similarity between the simulated transcript and the baseline framework, and access module 208 determines whether the level of semantic similarity is within the threshold tolerance. In response to determining that the level of semantic similarity is within the threshold tolerance, access module 208 provides 470 access to the first AI agent via the client device 110.

Figure 5:
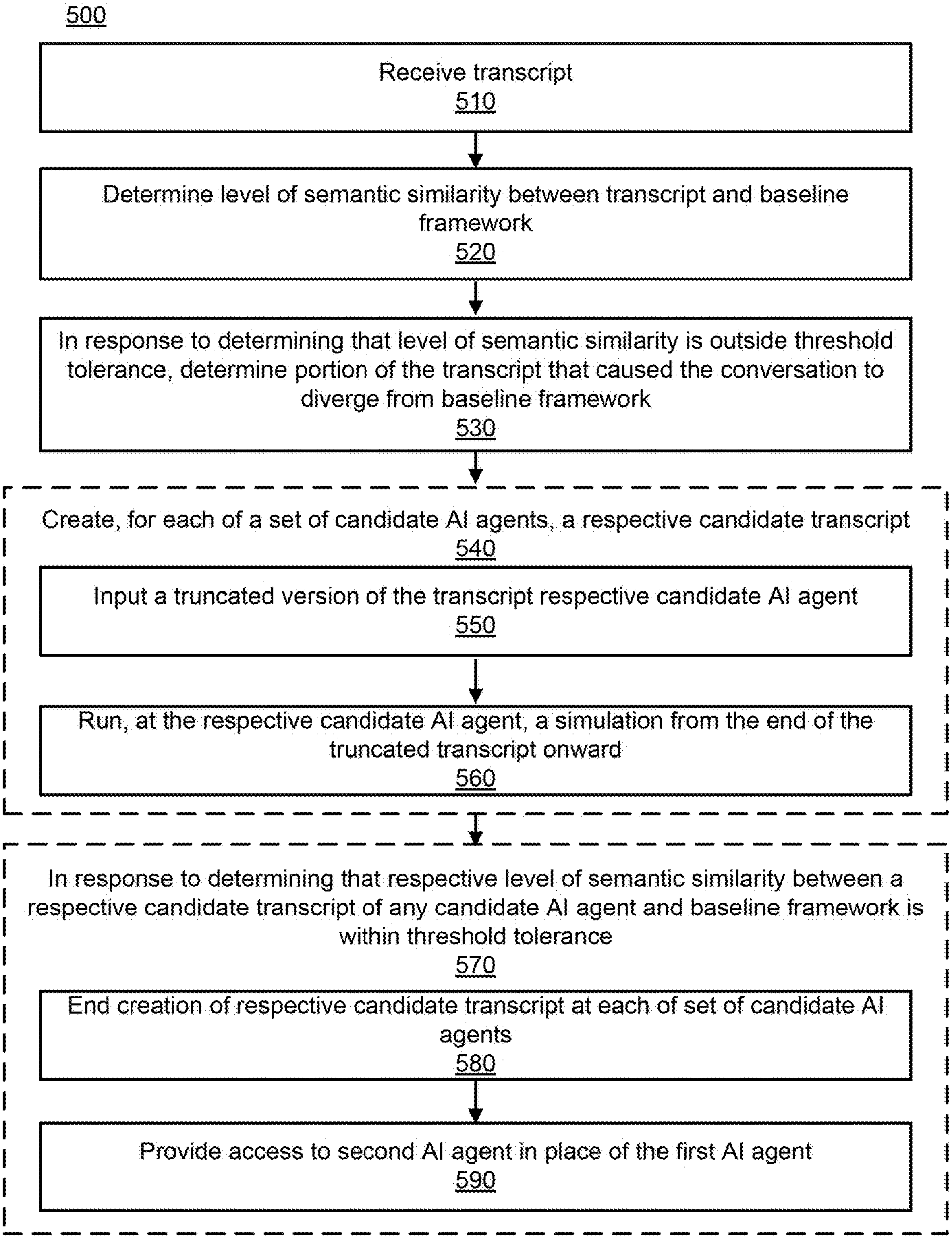
FIG. 5 is a flowchart for a method of selecting a replacement AI agent, in accordance with one or more embodiments.

FIG. 5 is a flowchart for a method 500 of selecting a replacement AI agent, in accordance with one or more embodiments. Alternative embodiments may include more, fewer, or different steps from those illustrated in FIG. 5, and the steps may be performed in a different order from that illustrated in FIG. 5. Method 500 may be executed by one or more processors 302 of a system, which may include a client device 110. The one or more processors may include processor 302 of agentic generation service 130 executing instructions (e.g., instructions 324) that cause one or more modules to perform their respective operations.

Access module 208 receives 510 a transcript of a conversation of queries from a user (via a client device 110) and responses to the queries provided by a first AI agent. The first AI agent is configured to provide responses with respect to an objective during the conversation. The objective is associated with a baseline framework for evaluating an efficacy of the conversation in data store 214. Access module 208 determines 520 whether a level of semantic similarity between the transcript and the baseline framework is within a threshold tolerance. In response to determining that the level of semantic similarity between the transcript and the baseline framework is outside the threshold tolerance, remediation module 210 determines 530 a portion of the transcript that caused the conversation to diverge from the baseline framework. Remediation module 210 creates 540, for each of a set of candidate AI agents, a respective candidate transcript, by inputting 550 a truncated version of the transcript a respective candidate AI agent and running 560, with the respective candidate AI agent via simulation module 204, a simulation from the end of the truncated transcript onward. The truncated version of the transcript ends at the portion of the transcript that caused the conversation to diverge from the baseline framework, and the respective candidate transcript includes the truncated transcript, outputs of the respective candidate AI agent in response to inputting the truncated version of the transcript, and outputs of the respective candidate AI agent during the simulation.

In response 570 to determining that a respective level of semantic similarity between a respective candidate transcript of any candidate AI agent of the set of candidate AI agents and the baseline framework is within the threshold tolerance, remediation module 210 selects the any candidate AI agent as a second AI agent to replace the first AI agent and ends 580 creation of the respective candidate transcript at each of the set of candidate AI agents. Remediation module 210 provides 590 access to the second AI agent in place of the first AI agent.

Figure 6:
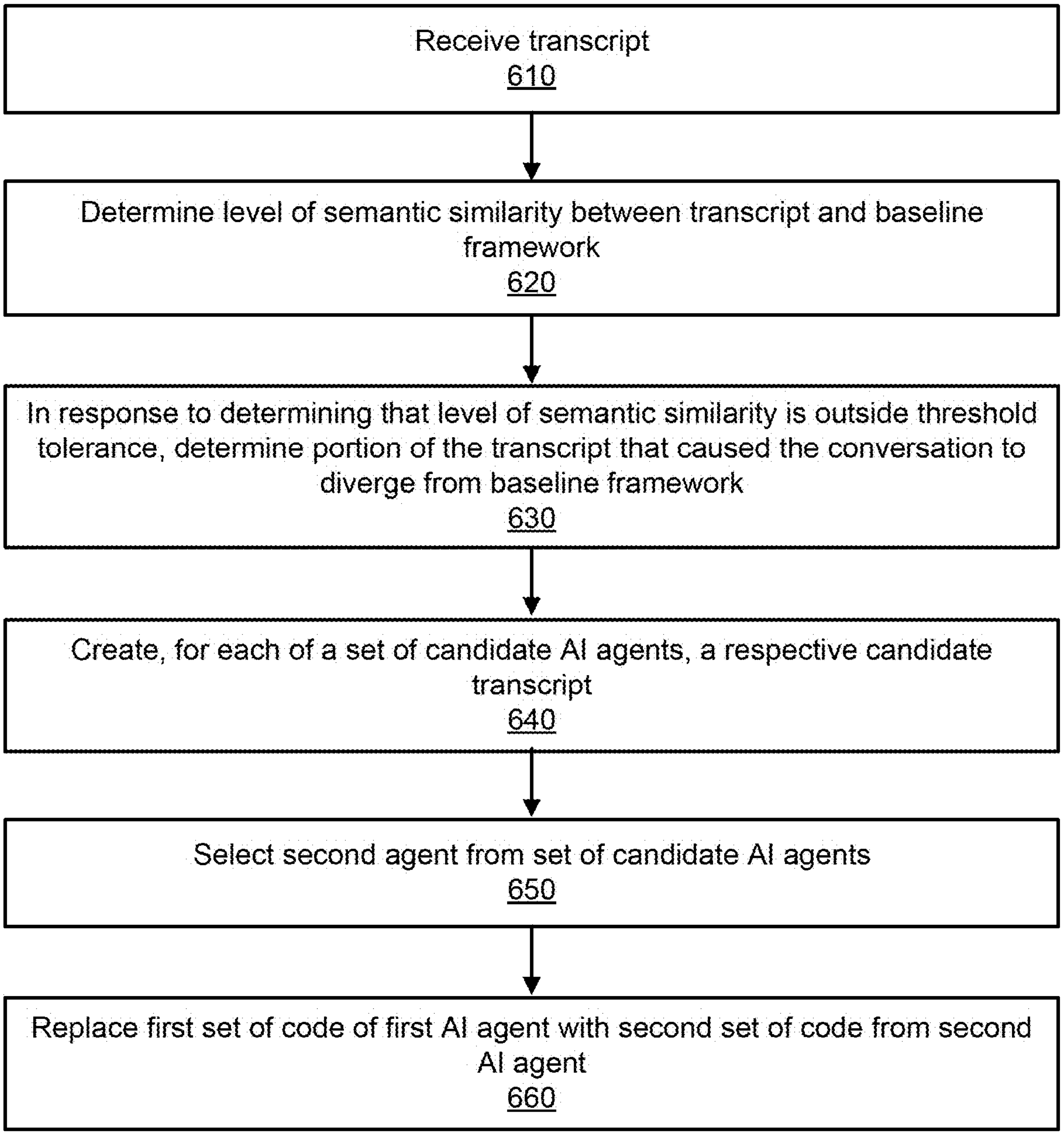
FIG. 6 is a flowchart for a method of debugging an AI agent, in accordance with one or more embodiments.

FIG. 6 is a flowchart for a method 600 of debugging an AI agent, in accordance with one or more embodiments. Alternative embodiments may include more, fewer, or different steps from those illustrated in FIG. 6, and the steps may be performed in a different order from that illustrated in FIG. 6. Method 600 may be executed by one or more processors 302 of a system, which may include a client device 110. The one or more processors may include processor 302 of agentic generation service 130 executing instructions (e.g., instructions 324) that cause one or more modules to perform their respective operations.

Access module 208 receives 610 a transcript of a conversation of queries from a user (via a client device 110) and responses to the queries provided by a first AI agent. The first AI agent is configured to provide responses with respect to an objective during the conversation. The objective is associated with a baseline framework for evaluating an efficacy of the conversation in data store 214. Access module 208 determines 620 whether a level of semantic similarity between the transcript and the baseline framework is within a threshold tolerance. In response to determining that the level of semantic similarity between the transcript and the baseline framework is outside the threshold tolerance, remediation module 210 determines 630 a portion of the transcript that caused the conversation to diverge from the baseline framework. Remediation module 210 creates 640, for each of a set of candidate AI agents in parallel, a respective candidate transcript.

Remediation module 210 selects 650, from the set of candidate AI agents, a second AI agent associated with a respective candidate transcript with a highest respective level of semantic similarity to the baseline framework. Remediation module 210 replaces 660 a first set of code of the first AI agent with a second set of code from the second AI agent. In some embodiments, remediation module 210 requests simulation module 204 run a simulation using the code of the first AI agent that includes the replacement to validate the code, thus verifying that the first AI agent is outputting as expected (e.g., a simulated conversation that is within the threshold tolerance of semantic similarity to the baseline framework).

ALTERNATIVE EMBODIMENTS

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative designs for a unified communication interface providing various communication services. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed:

1. A method comprising:

receiving a transcript of a conversation of queries from a user and responses to the queries provided by a first artificial intelligence (AI) agent, the first AI agent configured to provide responses with respect to an objective during the conversation, wherein the objective is associated with a baseline framework for evaluating an efficacy of the conversation;

determining whether a level of semantic similarity between the transcript and the baseline framework is within a threshold tolerance;

in response to determining that the level of semantic similarity between the transcript and the baseline framework is outside the threshold tolerance, determining a portion of the transcript that caused the conversation to diverge from the baseline framework;

creating, for each of a set of candidate AI agents, a respective candidate transcript, by:

inputting a truncated version of the transcript to a respective candidate AI agent, wherein the truncated version of the transcript ends at the portion of the transcript that caused the conversation to diverge from the baseline framework; and running, at the respective candidate AI agent, a simulation from the end of the truncated transcript onward, wherein the respective candidate transcript includes the truncated version of the transcript, outputs of the respective candidate AI agent in response to inputting the truncated version of the transcript, and outputs of the respective candidate AI agent during the simulation; and in response to determining that a respective level of semantic similarity between a respective candidate transcript of any candidate AI agent of the set of candidate AI agents and the baseline framework is within the threshold tolerance:

selecting any candidate AI agent as a second AI agent to replace the first AI agent;

ending, at each of the set of candidate AI agents, creation of a respective candidate transcript; and providing access to the second AI agent in place of the first AI agent.

2. The method of claim 1, further comprising:

staggering creation of candidate transcripts by the set of candidate AI agents by:

selecting a first subset of the candidate AI agents, wherein each candidate AI agent in the first subset is associated with a respective likelihood of transcript creation over a first threshold;

for each candidate AI agent in the first subset, beginning processing for creation of a respective candidate transcript; and in response to determining that each candidate AI agent in the first subset has not produced a respective candidate transcript within a threshold amount of time:

ending processing at each candidate AI agent in the first subset;

selecting a second subset of the candidate AI agents, wherein each candidate AI agent in the second subset is associated with a respective likelihood of transcript creation over a second threshold, the second threshold lower than the first threshold; and beginning, for each candidate AI agent in the second subset, processing for creation of a respective candidate transcript.

3. The method of claim 1, further comprising:

in response to a respective level of semantic similarity between a respective candidate transcript of a first subset of the set of candidate AI agents and the baseline framework being outside of a second threshold tolerance:

ending processing each candidate AI agent in the first subset; and continuing processing at a second subset of candidate AI agents in the set of candidate AI agents, wherein the second AI agent is in the second subset.

4. The method of claim 1, wherein the baseline framework is determined by:

inputting, to a large language model, a first prompt to, based on the objective, generate the baseline framework, the objective described in instructions to generate the first AI agent.

5. The method of claim 1, further comprising:

in response to creation of candidate transcripts for the set of candidate AI agents exceeding a threshold time limit:

terminating creation of the candidate transcripts; and sending an alert to a client device associated with an operator.

6. The method of claim 1, further comprising:

extracting a representation of an entity, wherein the representation of the entity defines at least part of the objective.

7. The method of claim 6, wherein extracting the representation of the entity further comprises:

accessing a webpage associated with the entity; and scraping the webpage for a set of information related to the entity, wherein at least a subset of the set of information describes the at least part of the objective.

8. A non-transitory computer-readable storage medium storing instructions that, when executed, cause a processor to perform steps comprising:

receiving a transcript of a conversation of queries from a user and responses to the queries provided by a first artificial intelligence (AI) agent, the first AI agent configured to provide responses with respect to an objective during the conversation, wherein the objective is associated with a baseline framework for evaluating an efficacy of the conversation;

determining whether a level of semantic similarity between the transcript and the baseline framework is within a threshold tolerance;

in response to determining that the level of semantic similarity between the transcript and the baseline framework is outside the threshold tolerance, determining a portion of the transcript that caused the conversation to diverge from the baseline framework;

creating, for each of a set of candidate AI agents, a respective candidate transcript, by:

inputting a truncated version of the transcript to a respective candidate AI agent, wherein the truncated version of the transcript ends at the portion of the transcript that caused the conversation to diverge from the baseline framework; and running, at the respective candidate AI agent, a simulation from the end of the truncated transcript onward, wherein the respective candidate transcript includes the truncated version of the transcript, outputs of the respective candidate AI agent in response to inputting the truncated version of the transcript, and outputs of the respective candidate AI agent during the simulation; and in response to determining that a respective level of semantic similarity between a respective candidate transcript of any candidate AI agent of the set of candidate AI agents and the baseline framework is within the threshold tolerance:

selecting any candidate AI agent as a second AI agent to replace the first AI agent;
ending, at each of the set of candidate AI agents, creation of a respective candidate transcript; and
providing access to the second AI agent in place of the first AI agent.

9. The non-transitory computer-readable storage medium of claim 8, the steps further comprising:
staggering creation of candidate transcripts by the set of candidate AI agents by:
selecting a first subset of the candidate AI agents, wherein each candidate AI agent in the first subset is associated with a respective likelihood of transcript creation over a first threshold;
for each candidate AI agent in the first subset, beginning processing for creation of a respective candidate transcript; and
in response to determining that each candidate AI agent in the first subset has not produced a respective candidate transcript within a threshold amount of time:
ending processing at each candidate AI agent in the first subset;
selecting a second subset of the candidate AI agents, wherein each candidate AI agent in the second subset is associated with a respective likelihood of transcript creation over a second threshold, the second threshold lower than the first threshold; and
beginning, for each candidate AI agent in the second subset, processing for creation of a respective candidate transcript.

10. The non-transitory computer-readable storage medium of claim 8, the steps further comprising:
in response to a respective level of semantic similarity between a respective candidate transcript of a first subset of the set of candidate AI agents and the baseline framework being outside of a second threshold tolerance:
ending processing each candidate AI agent in the first subset; and
continuing processing at a second subset of candidate AI agents in the set of candidate AI agents, wherein the second AI agent is in the second subset.

11. The non-transitory computer-readable storage medium of claim 8, wherein the baseline framework is determined by:
inputting, to a large language model, a first prompt to, based on the objective, generate the baseline framework, the objective described in instructions to generate the first AI agent.

12. The non-transitory computer-readable storage medium of claim 8, the steps further comprising:
in response to creation of candidate transcripts for the set of candidate AI agents exceeding a threshold time limit:
terminating creation of the candidate transcripts; and
sending an alert to a client device associated with an operator.

13. The non-transitory computer-readable storage medium of claim 8, the steps further comprising:
extracting a representation of an entity, wherein the representation of the entity defines at least part of the objective.

14. The non-transitory computer-readable storage medium of claim 13, wherein extracting the representation of the entity further comprises:
accessing a webpage associated with the entity; and
scraping the webpage for a set of information related to the entity, wherein at least a subset of the set of information describes the at least part of the objective.

15. A system comprising:
a processor; and
a non-transitory computer-readable storage medium storing instructions that, when executed, cause the processor to perform steps comprising:
receiving a transcript of a conversation of queries from a user and responses to the queries provided by a first artificial intelligence (AI) agent, the first AI agent configured to provide responses with respect to an objective during the conversation, wherein the objective is associated with a baseline framework for evaluating an efficacy of the conversation;
determining whether a level of semantic similarity between the transcript and the baseline framework is within a threshold tolerance;
in response to determining that the level of semantic similarity between the transcript and the baseline framework is outside the threshold tolerance, determining a portion of the transcript that caused the conversation to diverge from the baseline framework;
creating, for each of a set of candidate AI agents, a respective candidate transcript, by:
inputting a truncated version of the transcript to a respective candidate AI agent, wherein the truncated version of the transcript ends at the portion of the transcript that caused the conversation to diverge from the baseline framework; and
running, at the respective candidate AI agent, a simulation from the end of the truncated transcript onward,
wherein the respective candidate transcript includes the truncated version of the transcript, outputs of the respective candidate AI agent in response to inputting the truncated version of the transcript, and outputs of the respective candidate AI agent during the simulation; and
in response to determining that a respective level of semantic similarity between a respective candidate transcript of any candidate AI agent of the set of candidate AI agents and the baseline framework is within the threshold tolerance:
selecting any candidate AI agent as a second AI agent to replace the first AI agent;
ending, at each of the set of candidate AI agents, creation of a respective candidate transcript; and
providing access to the second AI agent in place of the first AI agent.

16. The system of claim 15, the steps further comprising:
staggering creation of candidate transcripts by the set of candidate AI agents by:
selecting a first subset of the candidate AI agents, wherein each candidate AI agent in the first subset is associated with a respective likelihood of transcript creation over a first threshold;
for each candidate AI agent in the first subset, beginning processing for creation of a respective candidate transcript; and
in response to determining that each candidate AI agent in the first subset has not produced a respective candidate transcript within a threshold amount of time:
ending processing at each candidate AI agent in the first subset;

selecting a second subset of the candidate AI agents, wherein each candidate AI agent in the second subset is associated with a respective likelihood of transcript creation over a second threshold, the second threshold lower than the first threshold; and beginning, for each candidate AI agent in the second subset, processing for creation of a respective candidate transcript.

17. The system of claim 15, the steps further comprising:

in response to a respective level of semantic similarity between a respective candidate transcript of a first subset of the set of candidate AI agents and the baseline framework being outside of a second threshold tolerance:

ending processing each candidate AI agent in the first subset; and continuing processing at a second subset of candidate AI agents in the set of candidate AI agents, wherein the second AI agent is in the second subset.

18. The system of claim 15, wherein the baseline framework is determined by:

inputting, to a large language model, a first prompt to, based on the objective, generate the baseline framework, the objective described in instructions to generate the first AI agent.

19. The system of claim 15, the steps further comprising:

in response to creation of candidate transcripts for the set of candidate AI agents exceeding a threshold time limit:

terminating creation of the candidate transcripts; and sending an alert to a client device associated with an operator.

20. The system of claim 15, the steps further comprising:

extracting a representation of an entity, wherein the representation of the entity defines at least part of the objective.

* * * * *